(12) United States Patent
Koç et al.

(10) Patent No.: US 6,343,305 B1
(45) Date of Patent: Jan. 29, 2002

(54) METHODS AND APPARATUS FOR MULTIPLICATION IN A GALOIS FIELD GF ($2^M$), ENCODERS AND DECODERS USING SAME

(75) Inventors: Çetin Kaya Koç, Corvallis, OR (US); Berk Sunar, Shrewsbury, MA (US)

(73) Assignee: The State of Oregon Acting by and through the State Board of Higher Education on Behalf of Oregon State University, Corvallis, OR (US)

( * ) Notice: Subject to any disclaimer, the term of this patent is extended or adjusted under 35 U.S.C. 154(b) by 0 days.

(21) Appl. No.: 09/395,414

(22) Filed: Sep. 14, 1999

(51) Int. Cl.$^7$ ................................................ G06F 7/00
(52) U.S. Cl. ...................................................... 708/492
(58) Field of Search ................................ 708/491, 492; 380/28

(56) References Cited

U.S. PATENT DOCUMENTS

| | | | |
|---|---|---|---|
| 4,587,627 A | 5/1986 | Omura et al. | |
| 4,745,568 A | 5/1988 | Onyszchuk et al. | |
| 5,854,759 A | 12/1998 | Kaliski, Jr. et al. | |
| 6,049,815 A | * 4/2000 | Lambert et al. | ............ 708/492 |

FOREIGN PATENT DOCUMENTS

| GB | 2323457 | 9/1998 |
|---|---|---|
| WO | WO 99/30458 | 6/1999 |

OTHER PUBLICATIONS

Blake et al., "Efficient Arithmetic in GF($2^n$) through Palindromic Representation," Hewlett–Packard Company, *HPL–98–134* (Aug., 1988).

Koç et al., "Low–Complexity Bit–Parallel Canonical and Normal Basis Multipliers for a Class of Finite Fields," *IEEE Transactions on Computers* 47:353–356 (1998).

Mastrovito, E., "VLSI Designs For Multiplication Over Finite Fields GF ($2^m$)," *Springer–Verlag*, 6$^{th}$ Intl. Conference, AAECC–6 (1988).

Itoh et al., "Structure of Parallel Multipliers for a Class of Fields GF ($2^m$)," *Information and Computation* 83:21–40 (1989).

Hasan et al., "A Modified Massey–Omura Parallel Multiplier for a Class of Finite Fields," *IEEE Transactions on Computers* 42: 1278–1280 (Oct. 1993).

* cited by examiner

*Primary Examiner*—Chuong Dinh Ngo
(74) *Attorney, Agent, or Firm*—Klarquist Sparkman, LLP (57) ABSTRACT

Methods and apparatus for multiplication in the Galois field GF($2^m$) are provided. The methods transform elements of the Galois field into a basis obtained by a permutation of an optimal normal basis. In an embodiment, a multiplier is provided that includes $m^2$ AND gates and $1.5(m^2-m)$ XOR gates. The methods are implemented in hardware such as integrated circuits or in software instructions stored in a computer readable medium such as a hard disk.

25 Claims, 3 Drawing Sheets

METHODS AND APPARATUS FOR MULTIPLICATION IN A GALOIS FIELD GF (2^M), ENCODERS AND DECODERS USING SAME

FIELD OF THE INVENTION

The invention pertains to methods and apparatus for performing multiplication in the Galois field, and encoders and decoders that use such methods and apparatus.

BACKGROUND OF THE INVENTION

Arithmetic operations in the Galois field $GF(2^m)$ have numerous applications in coding theory, computer algebra, communications systems, and cryptography. Most of these applications require fast methods or simple, inexpensive integrated circuits for performing arithmetic operations such as addition, multiplication, squaring, and exponentiation. The relative speed of a method is referred to herein as an method's time-complexity; the relative circuit area (typically semiconductor wafer area) required to implement the method in an integrated circuit is referred to as a method's area-complexity.

The Galois field $GF(2^m)$ is a set containing a finite number ($2^m$) of elements, wherein m is a positive integer. The elements of the Galois field $GF(2^m)$ can be represented in many ways and a representation is said to be isomorphic with respect to another representation if the two representations have the same number of elements and the properties of the elements are the same, but the elements occur in a different order. Even if two representations are isomorphic, the time- and area-complexity of arithmetic operations can differ.

Prior-art methods for multiplication in $GF(2^m)$ include the Massey-Omura method disclosed in U.S. Pat. No. 4,587,627. The Massey-Omura method uses a so-called normal basis representation of the elements of $GF(2^m)$. Other methods for multiplication using a so-called canonical basis representation have been described in, for example, Mastrovito, "VLSI Architectures for Multiplication over the Finite Field $GF(2^m)$," *Lecture Notes in Computer Science*, vol. 357, pp. 297–309 (1988); Itoh and Tsujii, "Structure of Parallel Multipliers for a Class of Finite Fields $GF(2^m)$," *Information and Computation*, vol. 83, pp. 21–40, 1989; and Koç and Sunar, "Low-Complexity Bit-Parallel Canonical and Normal Basis Multipliers for a Class of Finite Fields," *IEEE Trans. on Computers*, vol. 47, pp. 353–356, March, 1998. These canonical basis methods are generally considered superior to the Massey-Omura method because of their superior time-complexity or area-complexity. Efficient methods using the normal basis for special classes of Galois fields have been disclosed by, e.g., Hasan et al., "A Modified Massey-Omura Parallel Multiplier for a Class of Finite Fields," *IEEE Trans. on Computers*, vol. 42, pp. 1278–1280, October, 1993. Unfortunately, these methods work only for Galois fields having a particular type of basis (a so-called type I optimal normal basis). The Massey-Omura method appears to be the only method useful with optimal normal bases of both type I and type II. Unfortunately, the area-complexity of the Massey-Omura method is about twice that of these more specialized methods. For example, in an integrated circuit implementation, the Massey-Omura method requires $2(m^2-m)$ XOR gates while the more specialized multipliers of Koç and Sunar, and Hasan et al. require only $m^2-1$ XOR gates and therefore require less wafer area to implement in an integrated circuit.

Because many practical applications of Galois fields require rapid computations and simple, inexpensive hardware or software, improved methods and apparatus for Galois field arithmetic are needed. For example, digital data blocks of length m can be conveniently treated as elements of the finite Galois field $GF(2^m)$ and methods and apparatus for such digital data blocks have many practical applications.

SUMMARY OF THE INVENTION

Multi plication methods and apparatus for manipulating digital data blocks represented as elements of the finite Galois field $GF(2^m)$ are provided. In a representative method, a product $C = A \cdot B$ of elements A, B of $GF(2^m)$ is obtained by converting the elements A, B from an optimal normal basis representation to a representation in a modified basis N by rearrangement of coefficients $a_i$, $b_j$ of A, B, respectively. The elements A, B both correspond to respective digital data blocks, represented in $GF(2^m)$. The product C is obtained in the modified basis and can be converted into the optimal normal basis or can be left in the modified basis. For example, if additional multiplications are to be performed, the product C is generally left in the modified basis, whereas if no additional multiplications are needed, the product C can be transformed into the optimal normal basis using a rearrangement of some or all of the coefficients of C. If a representation of the product C in the modified basis is suitable, transformation into the optimal normal basis is omitted.

The elements A, B have respective coefficients $a'_j$ and $b'_j$ in the optimal normal basis, and coefficients $a_j$, $b_j$ in the modified basis are obtained using the rearrangement:

$$j = \begin{cases} k & \text{if } 1 \le k \le m, \\ (2m+1) - k & \text{if } m+1 \le k \le 2m. \end{cases} \tag{1}$$

where $k = 2^{i-1} \mod (2m+1)$ and $a_j = a'_i$ and $b_j = b'_i$.

Coefficients $c_l$ of the product C are obtained by summing products $a_i b_j$ of the coefficients such that:

$$c_l = \sum_{j=1}^{m-l}(a_j b_{j+l} + a_{j+l}b_j) + \sum_{j=1}^{l-1} a_j b_{l-j} + \sum_{j=1}^{l} a_{m-l+j}b_m - j_{m-j+1}.$$

According to another aspect of the invention, a multiplier is provided for multiplication in $GF(2^m)$. A representative embodiment of such a multiplier comprises AND gates for obtaining products of coefficients(such as $a_i b_j$) and XOR gates for summing the products. The multiplier can include a converter that transforms the coefficients of an element A of $GF(2^m)$ expressed in an optimal normal basis to a modified basis. In another embodiment, the multiplier is an integrated circuit.

According to yet another aspect of the invention, a computer-readable medium is provided that includes software for performing multiplication in $GF(2^m)$. The software includes a conversion component that converts a representation of an element A, expressed in an optimal normal basis, to a modified basis. The software also includes instructions for calculating a product $C = A \cdot B$ by calculating products $a_i b_j$ of coefficients of A and B, and summing the products to obtain coefficients of C in the modified basis. In a further embodiment, instructions are provided for transforming the product into an optimal normal or other basis.

These and other embodiments and features of the invention are described with reference to the accompanying drawings.

DETAILED DESCRIPTION

Because the disclosure pertains to methods and apparatus involving Galois field arithmetic, some properties of Galois fields are briefly summarized. More complete descriptions can be found in, for example, R. Lidl and H. Niederreiter, *Introduction to Finite Fields and their Applications*, New York, N.Y., Cambridge University Press (1994), which is incorporated herein by reference.

For convenience, a few general definitions are provided first. The symbol $\epsilon$ represents "is an element of", e.g., $A \epsilon S$ means that A is an element of the set S. The relationship $1 \leq j \leq m$ is written as $j \epsilon [1,m]$. Finally, if a and b are any two integers and m is a positive integer, a is said to be "congruent" to b mod m if a and b differ by a multiple of m. The congruence of a and b is written a≡b mod m. Finally, $Z_{2m}+1$ is the set of integers $\{0, 1, \ldots, 2m+1\}$.

A Galois field GF is a non-empty set in which two operations, generally referred to as multiplication (·) and addition (+), are defined. The Galois field GF is closed under the operations of multiplication and addition. If A and B are elements of GF, then C=A·B and D=A+B are also elements of GF. In addition, the Galois field GF has a multiplicative identity 1 such that A·1=1·A=A for any A$\epsilon$GF. Any element A$\epsilon$GF also has a multiplicative inverse $A^{-1} \epsilon$GF such that $A \cdot A^{-1} = A^{-1} \cdot A = 1$.

For applications such as signal processing, signal coding, error correction, cryptography, and signal transmission, mathematical operations in the Galois field GF($2^m$) containing $2^m$ elements are especially important. For m=1, the Galois field GF($2^m$)=GF(2) has two elements that are conveniently represented by the integers 0 and 1. Mathematical operations on the elements 0 and 1 in GF(2) follow the usual rules of arithmetic with the exception that the result obtained is evaluated "modulo-two" (i.e., "mod 2"). In modulo-two arithmetic, a result is obtained normally and then divided by two until a remainder of either 0 or 1 is obtained. For example, according to usual rules of arithmetic, 1+1=2. Because 2/2=1 with a remainder of 0, the sum 1+1 evaluated modulo-two is 0, i.e. (1+1)≡0 mod 2. Alternatively, the modulo-two sum 1+1 in GF(2) is equivalent to binary addition without carrying.

The operations of addition and multiplication in GF(2) can be executed as logical operations. If logical TRUE corresponds to the integer 1, multiplication of 0, 1 is equivalent to a logical AND. If a, b are elements of GF(2) (i.e., A, B are either 0 or 1) then A=B=1 only if A=B=1. This is equivalent to A AND B, which is TRUE only if both A, B are true. Addition is equivalent to a logical exclusive OR (XOR). A sum A+B=0 if A=B=0 or A=B=1; otherwise the sum is 1. This is equivalent to A XOR B.

The Galois field GF($2^m$) exhibits several additional properties that are described in, for example, Peterson et al., Error-Correcting Codes, 2nd ed., MIT Press, Cambridge, Mass. (1994) that is incorporated herein by reference. Two properties useful for explaining embodiments of the invention are restated here for convenience. Any element A of the Galois field GF($2^m$) satisfies the equality $A^{2^m}=A$. Any elements A, B of the Galois field GF($2^m$) satisfy the equality $(A+B)^2=A^2+B^2$.

The Galois field GF($2^m$) is conveniently represented as an m-dimensional vector space defined over GF(2). A set of m linearly independent vectors that are elements of GF($2^m$) is called a basis of the Galois field GF($2^m$). Any element of the Galois field GF($2^m$) can be represented as a linear combination (sum) of these basis vectors. If a set M of linearly independent basis vectors of the form M={$\beta, \beta^2, \beta^4, \ldots, \beta^{2^{m-1}}$} is a basis of GF($2^m$) for some element $\beta \epsilon$GF($2^m$), then M is called a normal basis and the element $\beta$ is called a normal element. Using a set of linearly independent basis vectors such as the normal basis M, any element A of GF($2^m$) can be represented as a vector $a=(a_1, \ldots, a_m)$, where the components $a_i$ are in GF(2) (i.e., are either 1 or 0). For convenience, the notation a is used herein to refer to the components $(a_1, \ldots, a_m)$ and the components $a_i$ are referred to as components or as coefficients. In view of such a representation of the elements of GF($2^m$), it is apparent that digital data blocks having $2^m$ bits can be processed as elements of GF($2^m$). For example, coding methods (including both encoding and decoding) using arithmetic operations in the Galois field can be performed directly on digital data blocks of length $2^m$; digital data blocks of other lengths can be extended with additional bits before processing. Similarly, coders (including both encoders and decoders) can implement Galois field arithmetic on digital data blocks. Galois field arithmetic on digital data blocks can perform encryption, decryption, encoding, or decoding with error-correcting or error-detecting codes, such as Reed-Solomon or other BCH codes. (Such codes are discussed in, for example, Peterson et al.) As used herein, "coder" and "coding" refer to both encoders, decoders and encoding, decoding, respectively.

The efficiency of arithmetic operations in the Galois field GF($2^m$) is dependent on the basis used to represent the elements. For example, the complexity of the Massey-Omura method can be reduced using a normal basis called an optimal normal basis. There are two types of optimal normal basis, as classified in, for example, A. J. Menezes, ed., *Applications of Finite Fields*, Kluwer Academic Publishers, Boston, Mass. (1993), which is incorporated herein by reference. These bases are referred to as optimal normal bases of type I and type II.

A normal basis for which the normal element $\beta$ satisfies the condition $\beta = \gamma^1 + \gamma^{-1}$ is called a type II optimal normal basis, wherein the element $\gamma$ is in GF($2^m$) and is a primitive ($2^m+1$)th root of unity, i.e., $\gamma^{2^m+1}=1$ and $\gamma^i \neq 1$ for $1 \leq i \leq 2m$. Optimal normal bases of type II can be constructed for any Galois field GF($2^m$) for m such that 2m+1 is a prime number if either of the following two conditions is satisfied:

(1) 2 is primitive in $Z_{2m+1}$, or (2) 2m+1≡3 mod 4, and 2 generates the quadratic residues in $Z_{2m+1}$. The optimal normal bases corresponding to the conditions (1) and (2) are referred to as optimal normal bases of type IIa and type IIb, respectively.

Values of m for which optimal normal bases of types I and II exist are listed in, for example, A. J. Menezes, ed., *Applications of Finite Fields*, Boston, Mass., Kluwer Academic Publishers, (1993). Table 1 lists values of m in the range $2 \leq m \leq 2001$ for which an optimal normal basis exists. Values for which there is an optimal normal basis of type I are designated with an "x"; values for which an optimal normal basis of type II exists are designated with a "y." For some values of m, both type I and type II bases exist (designated "xy"). Referring to Table 1, for $2 \leq m \leq 2001$, there are 319 m values for which the Galois field GF($2^m$) has an optimal normal bases of type II. For these m values, efficient mathematical methods are particularly useful.

TABLE 1

The values of m between 1 and 2001 for which optimal normal bases of type I (x) or type II (y) exist

| | | | | | | | | | |
|---|---|---|---|---|---|---|---|---|---|
| 2 xy | 3 y | 4 x | 5 y | 6 y | 9 y | 10 x | 11 y | 12 x | 14 y |
| 18 xy | 23 y | 26 y | 28 x | 29 y | 30 y | 33 y | 35 y | 36 x | 39 y |
| 41 y | 50 y | 51 y | 52 x | 53 y | 58 x | 60 x | 65 y | 66 x | 69 y |
| 74 y | 81 y | 82 x | 83 y | 86 y | 89 y | 90 y | 95 y | 98 y | 99 y |
| 100 x | 105 y | 106 x | 113 y | 119 y | 130 x | 131 y | 134 y | 135 y | 138 x |
| 146 y | 148 x | 155 y | 158 y | 162 x | 172 x | 173 y | 174 y | 178 x | 179 y |
| 180 x | 183 y | 186 y | 189 y | 191 y | 194 y | 196 x | 209 y | 210 xy | 221 y |
| 226 y | 230 y | 231 y | 233 y | 239 y | 243 y | 245 y | 251 y | 254 y | 261 y |
| 268 x | 270 y | 273 y | 278 y | 281 y | 292 y | 293 y | 299 y | 303 y | 306 y |
| 309 y | 316 x | 323 y | 326 y | 329 y | 330 y | 338 y | 346 x | 348 x | 350 y |
| 354 y | 359 y | 371 y | 372 x | 375 y | 378 xy | 386 y | 388 x | 393 y | 398 y |
| 410 y | 411 y | 413 y | 414 y | 418 y | 419 y | 420 x | 426 y | 429 y | 431 y |
| 438 y | 441 y | 442 x | 443 y | 453 y | 460 y | 466 x | 470 y | 473 y | 483 y |
| 490 x | 491 y | 495 y | 508 x | 509 y | 515 y | 519 y | 522 x | 530 y | 531 y |
| 540 y | 543 y | 545 y | 546 x | 554 y | 556 x | 558 y | 561 y | 562 x | 575 y |
| 585 y | 586 y | 593 y | 606 y | 611 y | 612 y | 614 y | 615 y | 618 xy | 629 y |
| 638 y | 639 y | 641 y | 645 y | 650 y | 651 y | 652 x | 653 y | 658 x | 659 y |
| 660 x | 676 x | 683 y | 686 y | 690 y | 700 x | 708 x | 713 y | 719 y | 723 y |
| 725 y | 726 y | 741 y | 743 y | 746 y | 749 y | 755 y | 756 x | 761 y | 765 y |
| 771 y | 772 x | 774 y | 779 y | 783 y | 785 y | 786 y | 791 y | 796 x | 803 y |
| 809 y | 810 y | 818 y | 820 x | 826 y | 828 y | 831 y | 833 y | 834 y | 846 y |
| 852 x | 858 x | 866 y | 870 y | 873 y | 876 y | 879 y | 882 x | 891 y | 893 y |
| 906 x | 911 y | 923 y | 930 y | 933 y | 935 y | 938 y | 939 y | 940 x | 946 x |
| 950 y | 953 y | 965 y | 974 y | 975 y | 986 y | 989 y | 993 y | 998 y | 1013 y |
| 1014 y | 1018 x | 1019 y | 1026 y | 1031 y | 1034 y | 1041 y | 1043 y | 1049 y | 1055 y |
| 1060 x | 1065 x | 1070 y | 1090 x | 1103 y | 1106 y | 1108 x | 1110 y | 1116 y | 1118 y |
| 1119 y | 1121 y | 1122 x | 1133 y | 1134 y | 1146 y | 1154 y | 1155 y | 1166 y | 1169 y |
| 1170 x | 1178 y | 1185 y | 1186 x | 1194 y | 1199 y | 1211 y | 1212 x | 1218 y | 1223 y |
| 1228 y | 1229 y | 1233 y | 1236 x | 1238 y | 1251 y | 1258 x | 1265 y | 1269 y | 1271 y |
| 1274 y | 1275 y | 1276 y | 1278 y | 1282 x | 1289 y | 1290 x | 1295 y | 1300 y | 1306 x |
| 1310 y | 1323 y | 1329 y | 1331 y | 1338 y | 1341 y | 1346 y | 1349 y | 1353 y | 1355 y |
| 1359 y | 1370 y | 1372 x | 1380 x | 1394 y | 1398 y | 1401 y | 1409 y | 1418 y | 1421 y |
| 1425 y | 1426 y | 1430 y | 1439 y | 1443 y | 1450 y | 1451 y | 1452 x | 1454 y | 1463 y |
| 1469 y | 1478 y | 1481 y | 1482 x | 1492 x | 1498 y | 1499 y | 1505 y | 1509 y | 1511 y |
| 1518 y | 1522 x | 1530 x | 1533 y | 1539 y | 1541 y | 1548 x | 1559 y | 1570 x | 1583 y |
| 1593 y | 1601 y | 1618 x | 1620 x | 1626 y | 1636 y | 1649 y | 1653 y | 1659 y | 1661 y |
| 1666 y | 1668 x | 1673 y | 1679 y | 1685 y | 1692 x | 1703 y | 1706 y | 1730 y | 1732 x |
| 1733 y | 1734 y | 1740 y | 1745 y | 1746 x | 1749 y | 1755 y | 1758 y | 1763 y | 1766 y |
| 1769 y | 1773 y | 1778 y | 1779 y | 1785 y | 1786 y | 1790 y | 1791 y | 1806 y | 1811 y |
| 1818 y | 1821 y | 1829 y | 1835 y | 1838 y | 1845 y | 1850 y | 1854 y | 1859 y | 1860 x |
| 1863 y | 1866 xy | 1876 y | 1883 y | 1889 y | 1898 y | 1900 x | 1901 y | 1906 x | 1923 y |
| 1925 y | 1926 y | 1930 y | 1931 y | 1938 y | 1948 y | 1953 y | 1955 y | 1958 y | 1959 y |
| 1961 y | 1965 y | 1972 x | 1973 y | 1978 x | 1983 y | 1986 x | 1994 y | 1996 x | 2001 y |

Multiplication of elements A, B of $GF(2^m)$ begins by representing A, B in an optimal normal basis of type II. Elements of a type II optimal normal basis M of $GF(2^m)$ are given by $$M = \{\beta, \beta^2, \beta^4, \ldots, \beta^{2^{m-1}}\} \quad (2)$$

wherein $\beta = \gamma + \gamma^{-1}$ is a normal element. Because $(\gamma + \gamma^{-1})^n = \gamma^n + \gamma^{-n}$ in $GF(2^m)$, the optimal normal basis M can be written as $$M = \{\gamma + \gamma^{-1}, \gamma^2 + \gamma^{-2}, \gamma^4 + \gamma^{-4}, \ldots, \gamma^{2^{m-1}} + \gamma^{-2^{m-1}}\}. \quad (3)$$

Arbitrary elements A, B of $GF(2^m)$ are expressed in the optimal normal basis M as $$A = a'_1 \beta + a'_2 \beta^2 + a'_3 \beta^{2^2} + \cdots + a'_m \beta^{2^{m-1}} = \sum_{i=1}^{m} a'_i \beta^{2^{i-1}} \quad (4)$$

and $$B = b'_1 \beta + b'_2 \beta^2 + b'_3 \beta^{2^2} + \cdots + b'_m \beta^{2^{m-1}} = \sum_{i=1}^{m} b'_i \beta^{2^{i-1}}. \quad (5)$$

The optimal normal basis M is rearranged to form a modified basis N, simplifying multiplication of A and B. If M is a type IIa optimal normal basis, then 2 is primitive in $Z_{2m+}$, and a set $P_1$ of powers of 2 evaluated modulo-$(2m+1)$, $$P_1 = \{2, 2^2, 2^3, \ldots, 2^{m-1}, 2^{2m}\} \bmod (2m+1) \quad (6)$$

is equivalent to a set $Q_1$, where $$Q_1 = \{1, 2, 3, 4, \ldots m\}. \quad (7)$$

The sets $P_1$ and $Q_1$ contain integers that are congruent modulo-$(2m+1)$, but arranged in a different order. If $2^i$, j are elements of $P_1$, $Q_1$, respectively, then for some i, j $$2^i \equiv j \bmod (2m+1). \quad (8)$$

Therefore, $2^i = j + K(2m+1)$, where K is an integer. Because $\gamma^{2m+1} = 1$ in $GF(2^m)$, then $\gamma_{2^i} = \gamma^j$. Accordingly, the exponents of $\gamma$ in the elements of the optimal normal basis M are reduced or increased by $2m+1$ so that all the exponents of $\gamma$ in the optimal normal basis M are brought into the range $[1,m]$. Therefore, the basis elements of the optimal normal basis M of the form $\gamma^{2^i} + \gamma^{-2^i}$ for $i \in [0, m-1]$, are written as $\gamma^j + \gamma^{-j}$ for some $j \in [1,m]$.

A similar transformation is performed with the optimal normal basis M of type IIb. For a type IIb basis, the multiplicative order of 2 mod(2m+1) is equal to m. A set $P_2$ of powers of 2, evaluated (mod 2m+1), $$P_2=\{2,2^2,2^3,\ldots,2^{m-1},2^m\} \bmod(2m+1) \quad (9)$$

includes m distinct integers in the range [1,2m]. These integers correspond to the exponents of the normal element β in the optimal normal basis M. If the exponent $2^i$, evaluated mod(2m+1), is in the range [1,m], then the exponent is not changed. If $2^i$ is in the range [m+1,2m+1], then $2^i$ is replaced with $(2m+1)-(2^i \bmod(2m+1))$, thereby bringing the exponent into the range [1,m]. Because the numbers $2^i$ are all distinct mod(2m+1), the set $P_2$ is equivalent to the set $$Q_2=\{1,2,4,\ldots,m\}. \quad (10)$$

Therefore, all exponents of γ can be brought into the range [1, m].

If the optimal normal basis M is either a type IIa or a type IIb basis, the basis M is rearranged into the modified basis N by reducing the exponents of γ into the range [1,m]. The modified basis N and the optimal normal basis M are:

$$M=\{\gamma+\gamma^{-1},\gamma^2+\gamma^{-2},\gamma^{2^2}+\gamma^{-2^2},\ldots,\gamma^{2^{(m-1)}}+\gamma^{-2^{(m-1)}}\} \quad (11)$$

$$N=\{\gamma+\gamma^{-1},\gamma^2+\gamma^{-2},\gamma^3+\gamma^{-3},\ldots,\gamma^m+\gamma^{-m}\} \quad (12)$$

These bases are equivalent in that the elements of the bases M, N are the same, but are arranged differently. For the Galois field $GF(2^m)$, the largest exponent of γ in the modified basis N is m.

Because the bases M, N are equivalent, the elements of the modified basis N can be obtained from the elements of the basis M by a permutation. Using the modified basis N, arbitrary members A, B of the Galois field GF can be written as $$A = \sum_{i=1}^{m} a_i \alpha_i = \sum_{i=1}^{m} a_i(\gamma^i + \gamma^{-i}), \quad (13)$$

and $$B = \sum_{i=1}^{m} b_i \alpha_i = \sum_{i=1}^{m} b_i(\gamma^i + \gamma^{-i}). \quad (14)$$

where the elements $\alpha_i$ of the modified basis N are $\alpha_i=\gamma^i+\gamma^{-i}$. The coefficients $a_i$, $b_i$ of A, B, respectively, in the modified basis N are obtained from respective coefficients $a'_i$, $b'_i$ in the optimal normal basis M using the following rearrangement:

$$j = \begin{cases} k & \text{if } 1 \leq k \leq m, \\ (2m+1)-k & \text{if } m+1 \leq k \leq 2m. \end{cases} \quad (15)$$

where $k=2^{i-1} \bmod(2m+1)$. Using Equation (15), the coefficients are related as $a_j=a'_i$ and $b_j=b'_i$. The elements A, B are transformed into the modified basis N by rearranging the respective coefficients $a'_i$, $b'_i$ as prescribed by Equation (15).

The product C=A·B is obtained using the representations of A, B in the modified basis N. After transforming A, B into the modified basis N using Equation (15), the product C=A·B is:

$$C = \sum_{l=1}^{m} c_l(\gamma^l + \gamma^{-l}) \quad (16)$$

$$= A \cdot B = \left(\sum_{i=1}^{m} a_i(\gamma^i + \gamma^{-i})\right)\left(\sum_{j=1}^{m} b_j(\gamma^j + \gamma^{-j})\right).$$

The product C (in the modified basis N) is found by determining the coefficients $c_l$ from the coefficients $a_i$, $b_j$. If A, B are already expressed in the modified basis N, no transformation of basis is required. To find the coefficients $c_l$, Equation (16) is rewritten as $$C = \sum_{i=1}^{m}\sum_{j=1}^{m} a_i b_j(\gamma^{i-j}+\gamma^{-(i-j)}) + \quad (17)$$

$$\sum_{j=1}^{m}\sum_{j=1}^{m} a_i b_j(\gamma^{i+j}+\gamma^{-(i+j)})$$

$$= X_1 + X_2,$$

defining sums $X_1$, $X_2$. Referring to the sum $X_1$, the absolute values of the exponents (i−j) are all less than or equal to m ($|i-j|\leq m$), and therefore correspond directly to powers of γ in the elements of the modified basis N. For the special case in which i=j, then $\gamma^{i-j}+\gamma^{-(i-j)}=\gamma^0+\gamma^0\equiv 0 \bmod 2$. Thus, the sum $X_1$ can be rewritten as:

$$X_1 = \sum_{i=1}^{m}\sum_{j=1}^{m} a_i b_j(\gamma^{i-j}+\gamma^{-(i-j)}) \quad (18)$$

$$= \sum_{\substack{1\leq i,j\leq m \\ i\neq j}} a_i b_j(\gamma^{i-j}+\gamma^{-(i-j)}).$$

If $k=|i-j|$, then the product $a_i b_j$ contributes to the coefficient $c_k$ of the basis element $\alpha_k=\gamma^k+\gamma^{-k}$. For example, a contribution to the coefficient $c_1$ from the sum $X_1$ includes the sum of all $a_i b_j$ for which $|i-j|=1$. Table 2 lists the contributions of the various products $a_i b_j$ to the coefficients $c_l$.

TABLE 2

Contributions to the coefficients $c_l$ from the sum $X_1$

| $c_1$ | $c_2$ | ... | $c_{m-2}$ | $c_{m-1}$ | $c_m$ |
|---|---|---|---|---|---|
| $a_1 b_2 + a_2 b_1$ | $a_1 b_3 + a_3 b_1$ | ... | $a_1 b_{m-1} + a_{m-1} b_1$ | $a_1 b_m + a_m b_1$ | |
| $a_2 b_3 + a_3 b_2$ | $a_2 b_4 + a_4 b_2$ | ... | $a_2 b_m + a_m b_2$ | | |
| . | . | | | | |
| . | . | | | | |
| . | . | | | | |
| $a_{m-2} b_{m-1} + a_{m-1} b_{m-2}$ | $a_{m-2} b_m + a_m b_{m-2}$ | | | | |
| $a_{m-1} b_m + a_m b_{m-1}$ | | | | | |

Referring to Table 2, the total contribution to a selected coefficient $c_l$ from the sum $X_1$ is:

$$c_l^{X_1} = \sum_{j=1}^{m} (a_j b_{j+l} + a_{j+l} b_j). \quad (19)$$

Contributions to the coefficients $c_l$ from the sum $X_2$ are obtained next. The sum $X_2$ is rewritten as:

$$X_2 = \sum_{i=1}^{m} \sum_{j=1}^{m} a_i b_j (\gamma^{i+j} + \gamma^{-(i+j)}) \quad (20)$$

$$= \sum_{i=1}^{m} \sum_{j=1}^{m} a_i b_j (\gamma^{i+j} + \gamma^{-(i+j)}) +$$

$$\sum_{i=1}^{m} \sum_{j=m-i+1}^{m} a_i b_j (\gamma^{i+j} + \gamma^{-(i+j)})$$

$$= Y_1 + Y_2, \quad (21)$$

defining sums $Y_1$, $Y_2$. The sum $Y_1$ includes powers of $\gamma$ of the form $\gamma^{i+j} + \gamma^{-(i+j)}$ wherein i+j is in the range $1 \leq (i+j) \leq m$. These powers of $\gamma$ therefore correspond directly to powers of $\gamma$ in the basis elements $\alpha_i$ of the modified basis N. If k=i+j, then a product $a_i b_j$ of the coefficients of A, B contributes to the coefficient $c_k$ of the product C. Table 3 lists the contributions to the coefficients $c_l$ from the sum $Y_1$.

TABLE 3

Contributions to the coefficients $c_l$ from the sum $Y_1$

| $c_1$ | $c_2$ | $c_3$ | ... | $c_{m-2}$ | $c_{m-1}$ | $c_m$ |
|---|---|---|---|---|---|---|
| $a_1b_1$ | $a_1b_2$ | ... | $a_1b_{m-3}$ | $a_1b_{m-2}$ | $a_1b_{m-1}$ |
| | $a_2b_1$ | ... | $a_2b_{m-4}$ | $a_2b_{m-3}$ | $a_2b_{m-2}$ |
| | | . | . | . |
| | | . | . | . |
| | | . | . | . |
| | | $a_{m-3}b_1$ | $a_{m-3}b_2$ | $a_{m-3}b_3$ |
| | | | $a_{m-2}b_1$ | $a_{m-2}b_2$ |
| | | | | $a_{m-1}b_1$ |

For a selected coefficient $c_l$, the total contribution from the sum $Y_1$ is:

$$c_l^{Y_1} = \sum_{j=1}^{l-1} a_j b_{l-j}. \quad (22)$$

Finally, contributions to the coefficients $c_l$ from the sum $Y_2$ are included. Referring to Equation (20), none of the exponents of $\gamma$ in the sum $Y_2$ are in the range [1,m]. However, the identity $\gamma^{2m+1} = 1$ permits transformation of the exponents into this range:

$$Y_2 = \sum_{i=1}^{m} \sum_{j=m-i+1}^{m} a_i b_j (\gamma^{i+j} + \gamma^{-(i+j)}) \quad (23)$$

$$= \sum_{i=1}^{m} \sum_{j=m-i+1}^{m} a_i b_j (\gamma^{2m+1-(i+j)} + \gamma^{-(2m+1-(i+j))}).$$

Therefore, if i+j>m, then the product $a_i b_j$ contributes to the coefficient $c_{2m+1-i-j}$. For example, the product $a_m b_m$ contributes to the coefficient $c_1$ since 2m+1−(m+m)=1. Table 4 lists contributions to the coefficients $c_l$ from the sum $Y_2$.

TABLE 4

Contributions to the coefficients $c_l$ from the sum $Y_2$

| $c_1$ | $c_2$ | $c_3$ | ... | $c_{m-2}$ | $c_{m-1}$ | $c_m$ |
|---|---|---|---|---|---|---|
| $a_m b_m$ | $a_{m-1}b_m$ | $a_{m-2}b_m$ | ... | $a_3 b_m$ | $a_2 b_m$ | $a_1 b_m$ |
| | $a_m b_{m-1}$ | $a_{m-1}b_{m-1}$ | ... | $a_4 b_{m-1}$ | $a_3 b_{m-1}$ | $a_2 b_{m-1}$ |
| | | $a_m b_{m-2}$ | ... | $a_5 b_{m-2}$ | $a_4 b_{m-2}$ | $a_3 b_{m-2}$ |
| | | | | . | . | . |
| | | | | . | . | . |
| | | | | . | . | . |
| | | | | $a_{m-1}b_4$ | $a_{m-2}b_4$ | $a_{m-3}b_4$ |
| | | | | $a_m b_3$ | $a_{m-1}b_3$ | $a_{m-2}b_3$ |
| | | | | | $a_m b_2$ | $a_{m-1}b_2$ |
| | | | | | | $a_m b_1$ |

The total contribution to a selected coefficient $c_l$ from the sum $Y_2$ is:

$$c_l^{Y_2} = \sum_{j=1}^{l} (a_{m-l+j} b_{m-j+1}) \quad (24)$$

Multiplication of A, B using the modified basis N is completed by summing the contributions to each of the coefficients $c_l$ listed in Tables 2–4. The sums $X_1, Y_1, Y_2$ as displayed in Tables 2–4 comprise products of coefficients of the form $a_i b_j$ for i, j∈[1,m]. The number of non-zero entries in Table 2 for a selected coefficient $c_l$ (the lth column of Table 2) from the sum $X_1$ is 2(m−l). This is the number of terms the sum $X_1$ contributes to the coefficient $c_l$. Referring to Table 3, the sum $Y_1$ includes l−1 contributions to the coefficient $c_l$, and referring to Table 4, the sum $Y_2$ includes l contributions to the coefficient $c_l$. Therefore, the total number of contributions to the coefficient $c_l$ from the sums $X_1, Y_1, Y_2$ is 2(m−l)+l−1+l=2m−1. Combining $c_l^{X_1}, c_l^{Y_1}, c_l^{Y_2}$ gives the following result for $c_l$:

$$c_l = \sum_{j=1}^{m-l} (a_j b_{j+l} + a_{j+l} b_j) + \sum_{j=1}^{l-1} (a_j b_{l-j}) + \sum_{j=1}^{l} (a_{m-l+j} b_{m-j+1}) \quad (25)$$

Referring further to Tables 2–4, if a product of coefficients $a_i b_j$ contributes to the coefficient $c_l$, then the product $a_j b_i$ also contributes to $c_l$. This is true for the contributions to the coefficient $c_l$ from all three of the sums $X_1, Y_1, Y_2$. Products of coefficients of the form $a_i b_i$ appear only once, either in the sum $Y_1$ or in the sum $Y_2$. The total number of contributions to the coefficient $c_l$ includes one contribution of the form $a_i b_i$ and 2m−2 contributions of the form $a_i b_j$, counting both $a_i b_j$ and $a_j b_i$.

EXAMPLE EMBODIMENTS

The modified basis N discussed above facilitates Galois field multiplication, and coding/decoding and cryptographic methods and apparatus that use Galois fields. Such methods and apparatus can be implemented as software or software modules for execution on a computer, such as a personal computer or an embedded microprocessor, or as circuits or circuit components implemented as, for example, an integrated circuit. In addition, application specific processors can use the modified basis N, implementing portions of the required rearrangement, multiplications, and sums in a combination of hardware and software.

Figure 1:
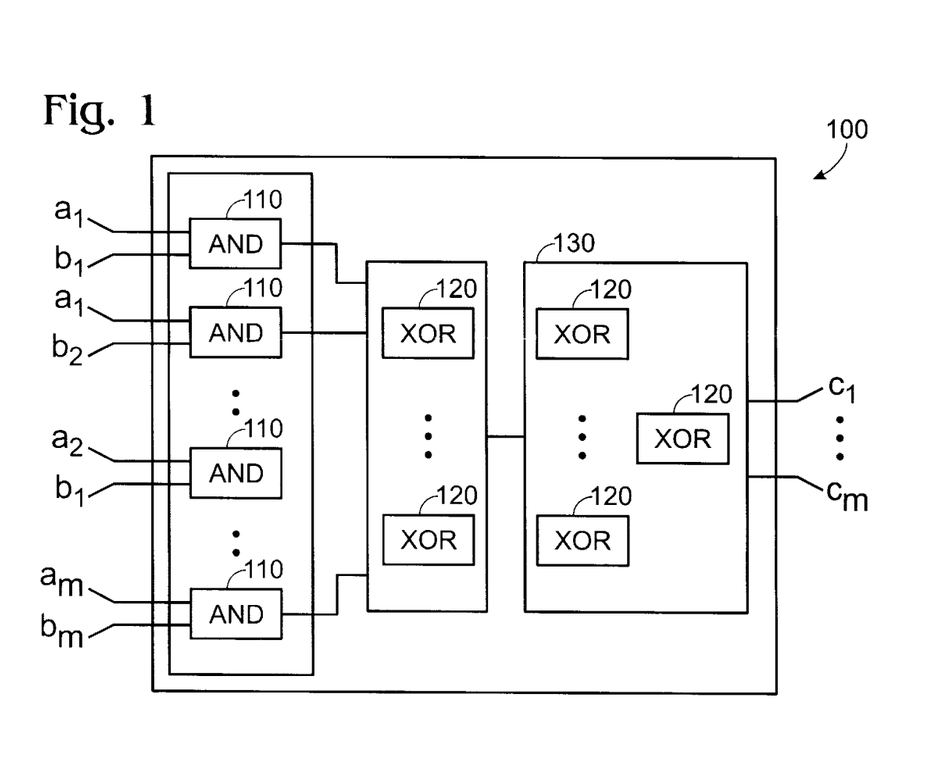
FIG. 1 is a block diagram of a representative multiplier that calculates a product of two elements of a Galois field.

FIG. 1 is a block diagram of a multiplier 100 (illustrated as an integrated circuit) for obtaining a product C=A·B of elements A, B of a Galois field. As noted above, the elements A, B are represented by respective coefficients $a_i$, $b_j$ of basis elements $\alpha_i$. The multiplier 100 includes $m^2$ two-input AND gates 110 that receive the respective coefficients $a_i$, $b_j$ as inputs and produce $m^2$ products $a_ib_j$ for i, j∈[1,m]. The multiplier 100 includes exclusive-OR (XOR) gates 120 that calculate the respective sums $t_{ij}=a_ib_j+a_jb_i$ for i=1,2, ..., m and j=i+1,i+2, ..., m. For GF($2^m$), the number of XOR gates 120 included is approximately $$(m-1)+(m-2)+\ldots+2+1=\tfrac{1}{2}m(m-1). \tag{26}$$

Figure 2:
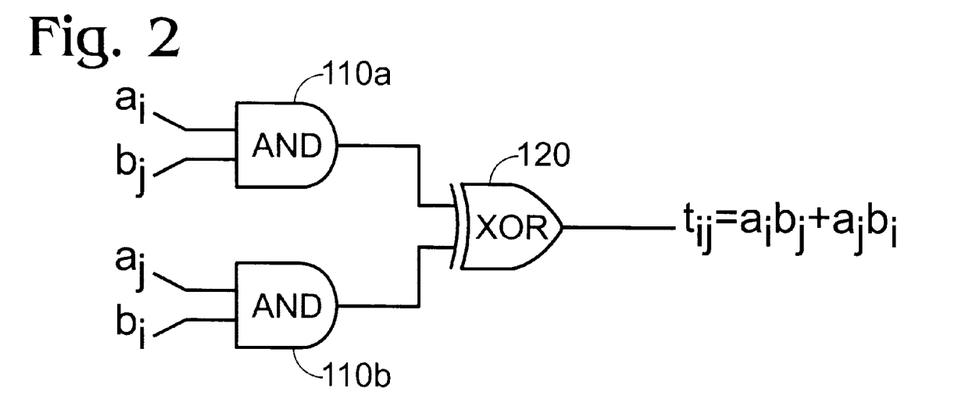
FIG. 2 illustrates an arrangement of gates for the multiplier of FIG. 1.

FIG. 2 illustrates the operation of the AND gates 110 and the XOR gate 120 to produce a sum $t_{ij}$. An AND gate 110a receives the respective coefficients $a_i$, $b_j$ as inputs and produces the product $a_ib_j$. An AND gate 110b receives the coefficients $a_j$, $b_i$ as inputs and produces the product $a_jb_i$. An XOR gate 120a receives and sums the products $a_ib_j$ and $a_jb_i$ to obtain $t_{ij}$.

Figure 3:
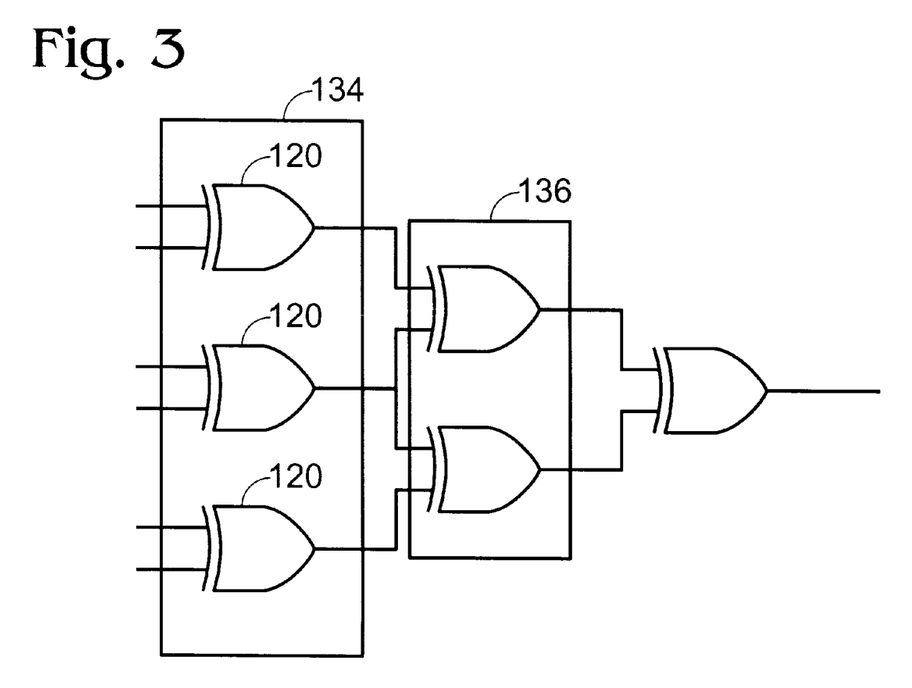
FIG. 3 illustrates a representative arrangement of gates for a binary XOR tree.

With reference to FIG. 1, a binary XOR tree 130 sums ½(2m−2)=m−1 terms of the form $t_{ij}$ and the product $a_ib_i$ to obtain $c_i$. The binary XOR tree 130 that sums these m products includes m−1 XOR gates 120 in order to sum the contributions for all the $c_i$ simultaneously. FIG. 3 illustrates a portion of the binary XOR tree 130. Inputs to be summed are provided to a set 134 of XOR gates 120. Outputs from the set 134 are summed in a set 136 of XOR gates. Additional sets of gates are provided so that all the inputs can be summed together.

The multiplier 100 obtains the products $a_ib_j$ in a single AND gate delay time $T_A$. Obtaining the sums $t_{ij}$ requires a single XOR gate delay time $T_X$. The coefficient $c_i$ includes ½(2m−2)=m−1 contributions of the form $t_{ij}$ and a single contribution of the form $a_ib_i$. The binary XOR tree 130 sums these m contributions with a total delay time of approximately $\lceil \log_2 m \rceil T_X$, where $T_X$ is the delay time of a single XOR gate. Because the contributions for all the coefficients $c_i$ are summed simultaneously, each of these sums experiences the same delay. Therefore, the calculation of the product C=A·B requires $m^2$ AND gates and ½m(m−1)+m(m−1)=3⁄2m(m−1) XOR gates, and the total gate delay is $T_A+T_X+\lceil \log_2 m \rceil T_X = T_A+(1+\lceil \log_2 m \rceil)T_X$. In contrast, a Massey-Omura muliplier requires $m^2$ AND gates and 2m(m−1) XOR gates, and computes the product C within a time period $T_A+(1+\lceil \log_2(m-1) \rceil)T_X$. The multiplier 100 uses 25% fewer XOR gates than a Massey-Omura multiplier. Therefore, the multiplier 100 executes Galois field multiplication more quickly and using less circuit area than a Massey-Omura multiplier.

Figure 4:
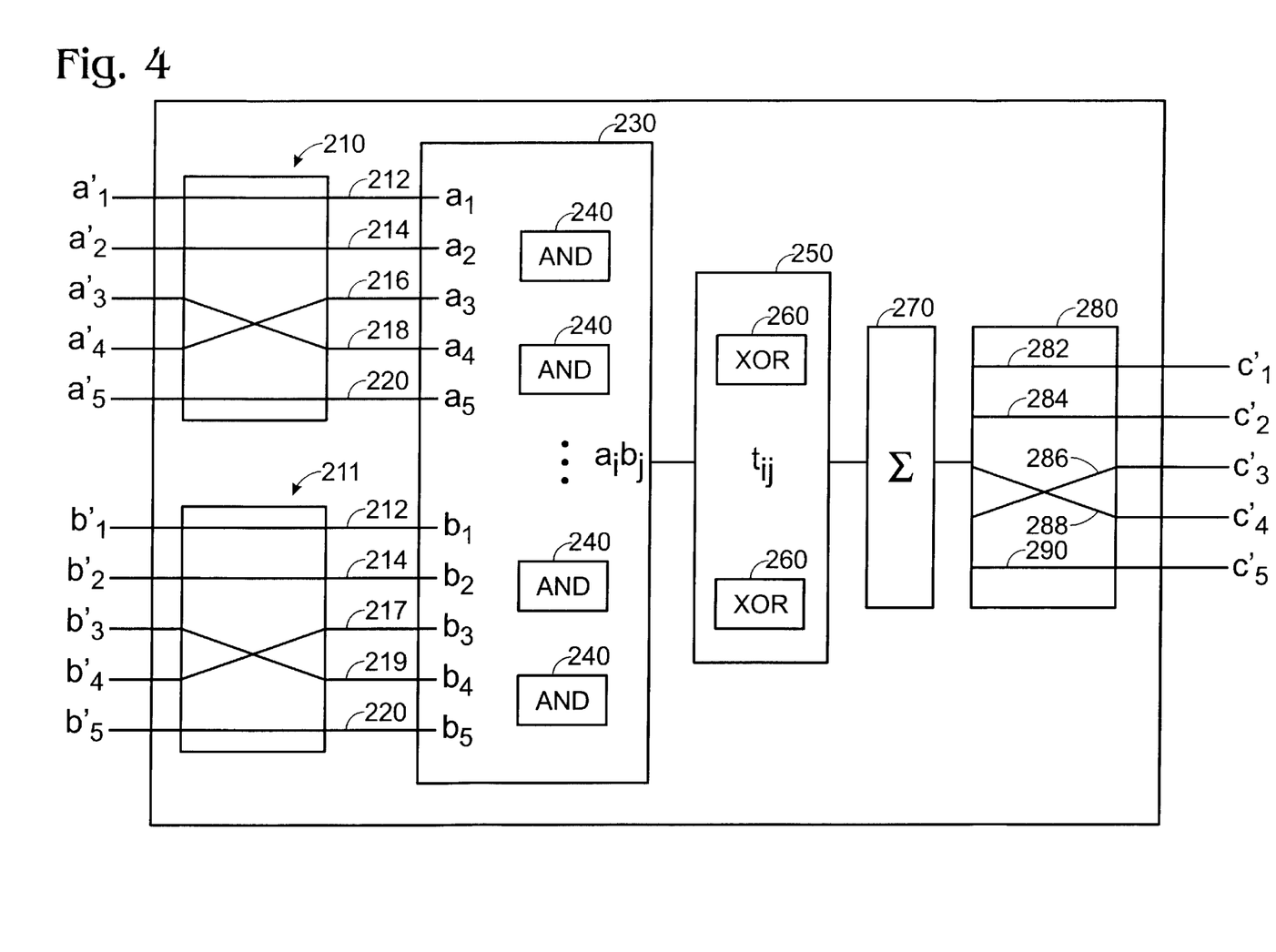
FIG. 4 is a block diagram of a representative multiplier for the Galois field GF ($2^5$)

As an example, multiplication of A, B in the Galois field GF($2^5$) is illustrated in FIG. 4. Because 2m+1=2·5+1=11 and 2 is primitive in $Z_{11}$, the Galois field GF($2^5$) has a type IIa optimal normal basis M of the form $M=\{\beta,\beta^2,\beta^4,\beta^8,\beta^{16}\}$, where $\beta=\gamma+\gamma^{-1}$. Using the identity $\gamma^{11}=1$, the optimal normal basis M is converted to the modified basis N. The first three exponents 1, 2, 4 of β are in the proper range, i.e., between 1 and 5. The other two exponents (8 and 16) are reduced by evaluating the exponents modulo-11. For the larger of the exponents, 16≡5 mod 11, and the exponent 16 is reduced to 5. To bring the remaining exponent 8 within the range [1,5], the substitution $\gamma^8=\gamma^{8-11}=\gamma^{-3}$ is used so that $\gamma^8+\gamma^{-8}=\gamma^{-3}+\gamma^3$. Therefore, the elements $\alpha_i$ of the modified basis N=$\{\alpha_1,\alpha_2,\alpha_3,\alpha_4,\alpha^5\}$ in terms of the elements of the optimal normal basis M are:

$$\beta=\gamma+\gamma^{-1}=\gamma+\gamma^{-1}=\alpha_1,$$

$$\beta^2=\gamma^2+\gamma^{-2}=\gamma^2+\gamma^{-2}=\alpha_2,$$

$$\beta^4=\gamma^4+\gamma^{-4}=\gamma^4+\gamma^{-4}=\alpha_4,$$

$$\beta^8=\gamma^8+\gamma^{-8}=\gamma^{-3}+\gamma^3=\alpha_3,$$

and $$\beta^{16}=\gamma^{16}+\gamma^{-16}=\gamma^5+\gamma^{-5}=\alpha_5. \tag{27}$$

To obtain the product C=A·B of A and B in GF($2^5$), the elements A, B, expressed in the optimal normal basis M, are transformed into the modified basis N. Following the previous discussion, the coefficients of A, B in the bases M, N are written as $a'_i$, $b'_i$ and $a_i$, $b_i$, respectively. Referring to Equation (27), for i=1,2,5, the coefficients $a_i=a'_i$ and $b_i=b'_i$. For i=3, the coefficients $a_3=a'_4$ and $b_3=b'_4$. For i=4, the coefficients $a_4=a'_3$ and $b_4=b'_3$. These transformations are summarized as:

$$(a_1,a_2,a_3,a_4,a_5)=(a'_1,a'_2,a'_4,a'_3,a'_5).$$

$$(b_1,b_2,b_3,b_4,b_5)=(b'_1,b'_2,b'_4,b'_3,b'_5).$$

Therefore, the coefficients of A, B in the modified basis N are:

$$A=(a'_1,a'_2,a'_4,a'_3,a'_5),$$

$$B=(b'_1,b'_2,b'_4,b'_3,b'_5).$$

FIG. 4 illustrates a multiplier 200 for GF($2^5$). The multiplier 200 includes input basis converters 210, 211 that convert inputs A, B expressed in the optimal normal basis M to the modified basis N. The input basis converter 210 includes connections 212, 214, 220 that deliver the coefficients $a_i$, $b_i$ for i =1, 2,5 directly to an AND block 230. Connections 216, 218 interchange $a'_3$ and $a'_4$ to arrange the coefficients $a_i$ in the order specified for the modified basis N. Connections 217, 219 similarly rearrange the respective coefficients of B. The connections 212, 214, 216, 217, 218, 219, 220 use a simple rewiring and do not require gates, and thus the transformation from the optimal normal basis M to the modified basis N adds no gate delays. The connections 212, 214, 216, 217, 218, 219, 220 can include buffers, or other output conditioning elements.

The AND block 230 includes $m^2=5^2=25$ AND gates 240 that receive the coefficients of A, B and produce the products $a_ib_j$ for i, j=1, 2, 3, 4, 5. FIG. 4 illustrates a portion of the AND block 230 that includes five AND gates 240 that form the products $a_ib_j$ for i, j=1, ... ,5. The AND block 230 delivers the products $a_ib_j$ to an XOR block 250 that includes ½m(m−1)=10 XOR gates 260. The XOR block 250 calculates the sums $t_{ij}=a_ib_j+a_jb_i$ for i=1,2,3,4,5 and j=i+1, i+2, ... , 5. For GF($2^5$), these terms are:

$$t_{12} = a_1b_2 + a_2b_1 \quad t_{13} = a_1b_3 + a_3b_1 \quad t_{14} = a_1b_4 + a_4b_1 \quad t_{15} = a_1b_5 + a_5b_1$$

$$t_{23} = a_2b_3 + a_3b_2 \quad t_{24} = a_2b_4 + a_4b_2 \quad t_{25} = a_2b_5 + a_5b_2$$

$$t_{34} = a_3b_4 + a_4b_3 \quad t_{35} = a_3b_5 + a_5b_3$$

$$t_{45} = a_4b_5 + a_5b_4$$

The multiplier 200 also includes a binary XOR tree 270 having $m^2-m=20$ XOR gates. The binary XOR tree 270 receives the sums $t_{ij}$ (20 terms) and the products $a_ib_i$ (5 terms) and computes the coefficients $c_i$ by summing the contributions:

$$c_1=t_{12}+t_{23}+t_{34}+t_{45}+a_5b_5$$

$$c_2=t_{13}+t_{24}+t_{35}+t_{45}+a_1b_1$$

$$c_3=t_{14}+t_{25}+t_{12}+t_{35}+a_4b_4$$

$$c_4=t_{15}+t_{13}+t_{25}+t_{34}+a_2b_2$$

$$c_5=t_{14}+t_{23}+t_{15}+t_{24}+a_3b_3$$

The multiplier 200 includes an output basis converter 280 that receives the coefficients $c_i$ in the modified basis N and produces the corresponding coefficients $c'_i$ in the optimal normal basis M. Referring to FIG. 4, connections 282, 284, 290 transmit the coefficients $c_1$, $c_2$, $c_5$ directly to an output as $c'_1$, $c'_2$, $c'_5$. Connections 286, 288 interchange $c_3$, $c_4$ and produce the coefficients $c'_3=c_4$ and $c'_4=c_3$. The permutation of the coefficients of C is:

$$(c'_1, c'_2, c'_3, c'_4, c'_5) = (c_1, c_2, c_4, c_3, c_5).$$

The multiplier 200 computes the products $a_i b_j$ in a single AND-gate delay time $T_A$ and the sums $t_{ij}$ in an additional XOR-gate delay time $T_X$. The branch XOR tree 270 takes an additional time of approximately $\log_2 5 T_X = 3 T_X$ so that the total computation time is about $T_A + 4 T_X$.

Table 5 summarizes the contributions of the sums $X_1$, $Y_1$, $Y_2$ to the coefficients $c_i$. The multiplier 200 uses $m^2=25$ AND gates and $1.5(m^2-m)=30$ XOR gates. The multiplication is completed in a time equal to $T_A + 4 T_X$ gate delays.

TABLE 5

The contributions of $X_1$, $Y_1$, $Y_2$, to the coefficients $c_i$ of the product $C = A \cdot B$ in $GF(2^5)$

| | $c_1$ | $c_2$ | $c_3$ | $c_4$ | $c_5$ |
|---|---|---|---|---|---|
| $X_1$ | $a_1 b_2 + a_2 b_1$<br>$a_2 b_3 + a_3 b_2$<br>$a_3 b_4 + a_4 b_3$<br>$a_4 b_5 + a_5 b_4$ | $a_1 b_3 + a_3 b_1$<br>$a_2 b_4 + a_4 b_2$<br>$a_3 b_5 + a_5 b_3$ | $a_1 b_4 + a_4 b_1$<br>$a_2 b_5 + a_5 b_2$ | $a_1 b_5 + a_5 b_1$ | |
| $Y_1$ | | $a_1 b_1$ | $a_1 b_2$<br>$a_2 b_1$ | $a_1 b_3$<br>$a_2 b_2$<br>$a_3 b_1$ | $a_1 b_4$<br>$a_2 b_3$<br>$a_3 b_2$<br>$a_4 b_1$ |
| $Y_2$ | $a_5 b_5$ | $a_4 b_5$<br>$a_5 b_4$ | $a_3 b_5$<br>$a_4 b_4$<br>$a_5 b_3$ | $a_2 b_5$<br>$a_3 b_4$<br>$a_4 b_3$<br>$a_5 b_2$ | $a_1 b_5$<br>$a_2 b_4$<br>$a_3 b_3$<br>$a_4 b_2$<br>$a_5 b_1$ |
| C | $t_{12}$<br>$t_{23}$<br>$t_{34}$<br>$t_{45}$<br>$a_5 b_5$ | $t_{13}$<br>$t_{24}$<br>$t_{35}$<br>$t_{45}$<br>$a_1 b_1$ | $t_{14}$<br>$t_{25}$<br>$t_{12}$<br>$t_{35}$<br>$a_4 b_4$ | $t_{15}$<br>$t_{13}$<br>$t_{25}$<br>$t_{34}$<br>$a_2 b_2$ | $t_{14}$<br>$t_{23}$<br>$t_{15}$<br>$t_{24}$<br>$a_3 b_3$ |

Figure 5:
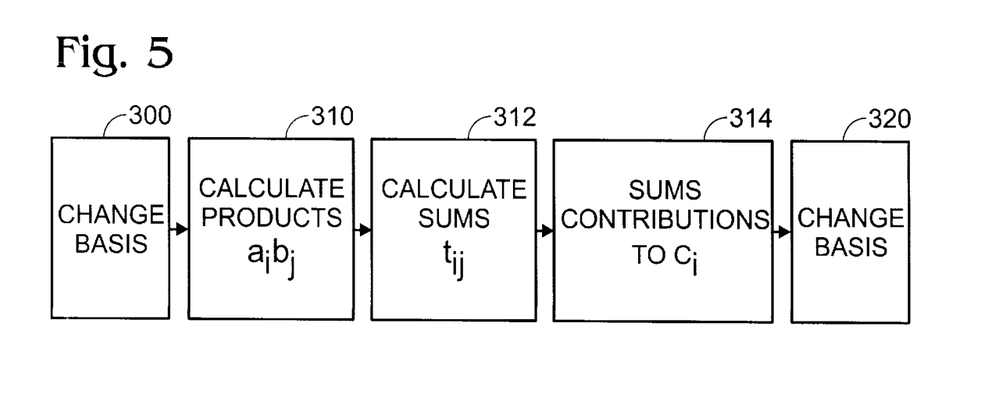
FIG. 5 is a block diagram of an embodiment of a program that performs Galois field multiplication using a computer.

In other embodiments, multiplication of elements A, B in the $GF(2^m)$ to obtain a product $C = A \cdot B$ is performed with a program or a software module written in, for example, a high-level programming language such as C++. The program is executed with a computer such as a personal computer, a workstation, an embedded processor, or with two or more distributed processors. FIG. 5 contains a block diagram of such a program. An input component 300 receives coefficients $a'_i$ and $b'_j$ of the elements A, B in an optimal normal basis M and permutes the coefficients, transforming the elements to a modified basis N. The permutation is prescribed in Equation (15). A component 310 calculates the products $a_i b_j$, a sum component 312 calculates sums $t_{ij} = a_i b_j + a_j b_i$, and a component 314 calculates the sums $X_1$, $Y_1$, $Y_2$ and determines the coefficients $c_j$. If additional multiplication in $GF(2^m)$ is anticipated, the product C is left in the modified basis. The program of FIG. 5 also includes an output component 320 that converts the coefficients $c_i$ into coefficients $c'_i$ in the optimal normal basis.

The program of FIG. 5 can be implemented to execute in conjunction with applications programs that encode, decode, encrypt, decrypt, or otherwise transform data, or can be implemented as a subroutine or as a component of a software function library.

The Galois field multipliers and methods can be used to, for example, multiply a digital data block, represented by an element A of a Galois field $GF(2^m)$ with another data block, represented by an element B of $GF(2^m)$. In some applications, powers of A of the form $A^n$ are obtained, wherein n is a positive integer. Products $A \cdot B$ and $a^n$ can represent an encrypted form of the digital data block A.

Applications of these multipliers include encoders and decoders for Reed-Solomon codes that are used in, for example, compact disc players, frequency-hop packet networks, and spread-spectrum multiple-access communication systems. In such applications, these multipliers provide an encoded data packet for transmission or decode a received data packet. Reed-Solomon codes are discussed in, for example, S. B. Wicker and V. K. Bhargava, ed., *Reed-Solomon Codes and Their Applications*, IEEE Press, New York, N.Y. (1994), which is incorporated herein by reference.

As another example application, cryptographic systems using finite field arithmetic can also use these multipliers. In one specific cryptographic system, the multipliers are used to implement the Diffie-Hellman algorithm to code a data packet or to decode a coded data packet. The Diffie-Hellman algorithm is described in, for example, W. Diffie and M. E. Hellman, "New Directions in Cryptography," *IEEE Trans. on Information Theory*, vol. 22, pp. 644–654 (1976), which is incorporated herein by reference. The coding/decoding with the Diffie-Hellman algorithm provides secure data transmission, secure data storage, data authentication, or a combination these features. In addition, such systems include so-called public keys, permitting simple key exchange. Public keys are described in, for example, W. Diffie, "The First Ten Years of Public-Key Cryptography," *Proceedings of the IEEE*, vol. 76, pp. 560–577 (1988), which is incorporated herein by reference.

As another specific example, the multipliers can also implement finite field multiplication in elliptic curve cryptosystems. Elliptic curve cryptosystems are described in, for example, G. B. Agnew et al., *IEEE Journal on Selected Areas in Communication*, vol. 11, pp. 804–813 (1993); A. J. Menezes, *Elliptic Curve Public Key Cryptosystems*, Kluwer Academic Publishers (1993); N. Koblitz, "Elliptic Curve Cryptosystems," *Mathematics of Computation*, vol. 48, pp. 203–209 (1987); and V. Miller, "Uses of Elliptic Curves in Cryptography," in H. C. Williams, ed., *Advances in Cryptology-CRYPTO 85 Proceedings, Lecture Notes in Computer Science*, vol. 218, pp. 363–378, Springer Verlag (1997), which are incorporated herein by reference. Elliptic curve cryptosystems can be included in electronic commerce systems, Internet-based transaction systems, digital signature systems, smartcards, and other communications and network systems.

Whereas the invention has been described in connection with several example embodiments, it will be understood that the invention is not limited to these embodiments. On the contrary, the invention is intended to encompass all alternatives, modifications, and equivalents as may be included within the spirit and scope of the invention as defined by the appended claims.

What is claimed is:

1. A method of coding a digital data block represented as an element A of a finite Galois field $GF(2^m)$, wherein m is an integer, using multiplication of the element A and an element B of $GF(2^m)$ to produce a product C, the element A having coefficients $a' = (a'_1, \ldots, a'_m)$ in an optimal normal basis, the method comprising:

rearranging the coefficients $a'$ to determine coefficients $a = (a_1, \ldots, a_m)$ of the element A in a modified basis $(\alpha, \alpha^2, \ldots, \alpha^m)$, wherein $\alpha$ is an element of $GF(2^m)$; and determining coefficients $c=(c_1, \ldots, c_m)$ of the product C in the modified basis, the coefficients c being equal to $$c_l = \sum_{j=1}^{m-l}(a_j b_{j+l} + a_{j+l} b_j) + \sum_{j=1}^{l-1} a_j b_{l-j} + \sum_{j=1}^{l} a_{m-l+j} b_{m-j+1},$$

wherein $b=(b_1, \ldots, b_m)$ are coefficients of the element B in the modified basis and j, l, m are integers such that $1 \leq i, j, l \leq m$.

2. The method of claim 1, wherein the coefficients a' in the optimal normal basis are rearranged into the coefficients a in the modified basis according to $a_j=a'_i$, wherein j corresponding to a selected i is determined based on $k=2^{i-1} \bmod(2m+1)$ such that if $1 \leq k \leq m$, then j=k, and if $m+1 \leq k \leq 2m$, then $j=(2m+1)-k$.

3. The method of claim 1, wherein the product C has coefficients $c=(c_1, \ldots, c_m)$ in the modified basis and further comprising rearranging the coefficients c to determine respective coefficients $c'=(c'_1, \ldots, c'_m)$ of the product C in the optimal normal basis.

4. A computer-readable medium, comprising software for performing the method of claim 3.

5. The method of claim 3, wherein the coefficients c in the modified basis are rearranged into coefficients c' in the optimal normal basis according to $c_j=c'_i$, wherein j corresponding to a selected i is determined based on $k=2^{i-1} \bmod(2m+1)$ such that if $1 \leq k \leq m$, then j=k, and if $m+1 \leq k \leq 2m$, then $j=(2m+1)-k$.

6. The method of claim 2, further comprising calculating at least a product of at least one of the coefficients a and one of the coefficients b using a logical AND operation.

7. The method of claim 2, further comprising calculating at least a sum of products of the coefficients a, b using a logical exclusive OR (XOR) operation.

8. A computer-readable medium, comprising software for performing the method of claim 1.

9. A multiplier for multiplying elements A, B of a Galois field $GF(2^m)$, wherein m is an integer, to obtain a product $C=A \cdot B$, wherein A, B, C have respective coefficients $a=(a_1, \ldots, a_m), b=(b_1, \ldots, b_m), c=(c_1, \ldots, c_m)$ in a modified basis $(\alpha, \alpha^2, \ldots, \alpha^m)$ of $GF(2^m)$, wherein $\alpha$ is an element of $GF(2^m)$, the multiplier comprising:
- an input situated and configured to receive the coefficients a, b;
- a product component that computes products $a_i b_j$, for i, $j \leq m$;
- a first sum component configured to receive the products $a_i b_j$ for i, $j \leq m$ and $i \neq j$ and to determine sums $t_{ij}=a_i b_j + a_j b_i$; and
- a second sum component configured to receive the sums $t_{ij}$ and products $a_k b_k$ to determine at least one of the coefficients c.

10. The method of claim 9, wherein the coefficients c are equal to $$c_l = \sum_{j=1}^{m-l}(a_j b_{j+l} + a_{j+l} b_j) + \sum_{j=1}^{l-1} a_j b_{l-j} + \sum_{j=1}^{l} a_{m-l+j} b_{m-j+1},$$

wherein j, l are integers such that $1 \leq j, l \leq m$.

11. The multiplier of claim 10, wherein A, B have respective coefficients $a'=(a'_1, \ldots, a'_m)$ and $b'=(b'_1, \ldots, b'_m)$ expressed in an optimal normal basis $(\beta, \beta^2, \ldots, \beta^{2^{m-1}})$ of $GF(2^m)$, wherein $\beta$ is an element of $GF(2^m)$, the multiplier further comprising an input basis converter that receives the coefficients a', b' and transforms the coefficients a', b' into the coefficients a, b, respectively.

12. The multiplier of claim 11, further comprising an output basis converter that transforms the coefficients c in the modified basis into coefficients c' in the optimal normal basis.

13. The multiplier of claim 10, further comprising an output basis converter that transforms the coefficients c in the modified basis into coefficients c' in an optimal normal basis.

14. An integrated circuit for calculating a product of elements of a finite Galois field $GF(2^m)$ wherein m is a positive integer, the integrated circuit comprising:
- an input situated and configured to receive coefficients a, b corresponding to respective elements A, B of the finite Galois field $GF(2^m)$ expressed in a modified basis $M=(\alpha, \alpha^2, \ldots, \alpha^m)$, wherein $\alpha$ is an element of $GF(2^m)$;
- AND gates configured to receive the coefficients a, b and to produce products of the coefficients of a and b; and
- XOR gates configured to sum the products of the coefficients a, b to obtain coefficients c of a product $C=A \cdot B$ in the modified basis such that $$c_l = \sum_{j=1}^{m-l}(a_j b_{j+l} + a_{j+l} b_j) + \sum_{j=1}^{l-1} a_j b_{l-j} + \sum_{j=1}^{l} a_{m-l+j} b_{m-j+1},$$

wherein j, l are integers such that $1 \leq j, 1 \leq m$.

15. The integrated circuit of claim 14, further comprising an input basis converter situated and configured to receive coefficients a', b' of A, B, respectively, in an optimal normal basis, convert the coefficients a', b' to the respective coefficients a, b and deliver the coefficients a, b to the input.

16. The integrated circuit of claim 15, wherein the input basis converter transforms the coefficients a' such that $a_j=a'_i$, wherein j corresponding to a selected i is determined based on $k=2^{i-1} \bmod(2m+1)$ such that if $1 \leq k \leq m$, then j=k, and if $m+1 \leq k \leq 2m$, then $j=(2m+1)-k$.

17. The integrated circuit of claim 16, wherein the input basis converter transforms the coefficients b' such that $b_j=b'_i$, wherein j corresponding to a selected i is determined based on $k=2^{i-1} \bmod(2m+1)$ such that if $1 \leq k \leq m$, then j=k, and if $m+1 \leq k \leq 2m$, then $j=(2m+1)-k$.

18. A basis converter for transforming a digital data block of length $2^m$ bits wherein m is an integer, represented by coefficients $a'=(a'_1, \ldots, a'_m)$ with respect to an optimal normal basis of a finite Galois field $GF(2^m)$, into a representation in a modified basis, the converter comprising:
- an input for receiving the coefficients a';
- a basis converter situated to receive the coefficients a' and convert the coefficients a' into respective coefficients a in a modified basis $(\alpha, \ldots, \alpha^m)$ wherein $\alpha$ is an element of $GF(2^m)$, such that $a_j=a'_i$, wherein j corresponding to a selected i is determined based on $k=2^{i-1} \bmod(2m+1)$ such that if $1 \leq k \leq m$, then j=k, and if $m+1 \leq k \leq 2m$, then $j=(2m+1)-k$, wherein i,j,m are integers such that $1 \leq i, j, m \leq m$.

19. A method of encrypting a digital data block having m data bits, the method comprising:
- expressing the digital data block as an element A of a finite Galois field $GF(2^m)$, the element A having coefficients a' in an optimal normal basis;
- transforming the coefficients of A in the optimal normal basis into respective coefficients a in a modified basis $(\alpha, \ldots, \alpha^m)$, wherein $\alpha$ is an element of $GF(2^m)$; and multiplying the digital data block by an element B of $GF(2^m)$ to obtain coefficients c of a product $C=A \cdot B$, such that the coefficients c are equal to:

$$c_l = \sum_{j=1}^{m-l}(a_j b_{j+l} + a_{j+l} b_j) + \sum_{j=1}^{l-1} a_j b_{l-j} + \sum_{j=1}^{l} a_{m-l+j} b_{m-j+1},$$

wherein the element B has coefficients $b=(b_1, \ldots, b_m)$ in the modified basis and l, j are integers such that $1 \leq l, j \leq m$.

20. The method of claim 19, wherein the element B is equal to the element A.

21. The method of claim 20, further comprising forming a product $A \cdot B^p$, wherein p is an integer, thereby forming an encrypted digital data block.

22. A multiplier for multiplying elements A, B of a Galois field $GF(2^m)$, wherein m is an integer, to obtain a product $C=A \cdot B$, wherein A, B, C have respective coefficients $a=(a_1, \ldots, a_m)$, $b=(b_1, \ldots, b_m)$, $c=(c_1, \ldots, c_m)$ in a modified basis $(\alpha, \alpha^2, \ldots, \alpha^m)$ of $GF(2^m)$, wherein $\alpha$ is an element of $GF(2^m)$, the multiplier comprising:

an input situated and configured to receive the coefficients a, b;

at least one AND gate that computes a product of at least one of the coefficients a and one of the coefficients b; and at least one exclusive OR (XOR) gate that produces a sum of products of the coefficients a, b to obtain at least one of the coefficients c, wherein the coefficients c are equal to $$c_l = \sum_{j=1}^{m-l}(a_j b_{j+l} + a_{j+l} b_j) + \sum_{j=1}^{l-1} a_j b_{l-j} + \sum_{j=1}^{l} a_{m-l+j} b_{m-j-1},$$

wherein j, l are integers such that $1 \leq j, l \leq m$.

23. The multiplier of claim 22, wherein A, B have respective coefficients $a'=(a'_1, \ldots, a'_m)$ and $b'=(b'_1, \ldots, b'_m)$ expressed in an optimal normal basis $(\beta, \beta^2, \ldots, \beta^{2^{m-1}})$ of $GF(2^m)$, wherein $\beta$ is an element of $GF(2^m)$, the multiplier further comprising an input basis converter that receives the coefficients a', b' and transforms the coefficients a', b' into the coefficients a, b, respectively.

24. The multiplier of claim 23, further comprising a output basis converter that transforms the coefficients c in the modified basis into coefficients c' in the optimal normal basis.

25. The multiplier of claim 22, further comprising an output basis converter that transforms the coefficients c in the modified basis into coefficients c' in an optimal normal basis.

* * * * *